United States Patent
Blanc et al.

(10) Patent No.: US 9,314,127 B2
(45) Date of Patent: Apr. 19, 2016

(54) SYSTEM FOR MAKING BEVERAGES BY INFUSING

(75) Inventors: Jean-Pierre Blanc, Nice (FR); Alain Goering, Nice (FR)

(73) Assignee: Compagnie Mediterraneenne Des Cafes (FR)

( * ) Notice: Subject to any disclaimer, the term of this patent is extended or adjusted under 35 U.S.C. 154(b) by 490 days.

(21) Appl. No.: 13/700,026

(22) PCT Filed: May 23, 2011

(86) PCT No.: PCT/EP2011/058390
§ 371 (c)(1),
(2), (4) Date: Jan. 15, 2013

(87) PCT Pub. No.: WO2011/147792
PCT Pub. Date: Dec. 1, 2011

(65) Prior Publication Data
US 2013/0139698 A1      Jun. 6, 2013

(30) Foreign Application Priority Data
May 25, 2010 (FR) ...................... 10 54009

(51) Int. Cl.
| | | |
|---|---|---|
| A47J 31/00 | (2006.01) | |
| A47J 31/40 | (2006.01) | |
| A47J 31/36 | (2006.01) | |

(52) U.S. Cl.
CPC .............. *A47J 31/40* (2013.01); *A47J 31/3633* (2013.01); *A47J 31/3638* (2013.01)

(58) Field of Classification Search
CPC .... A47J 31/3633; A47J 31/3638; A47J 31/40
USPC .......................... 99/289 T, 295, 302 P, 289 R
See application file for complete search history.

(56) References Cited

U.S. PATENT DOCUMENTS

| | | | | |
|---|---|---|---|---|
| 5,228,383 | A * | 7/1993 | Landais et al. | 99/289 R |
| 5,755,149 | A * | 5/1998 | Blanc et al. | 99/289 T |
| 7,350,456 | B2 * | 4/2008 | Blanc et al. | 99/302 P |
| 7,562,618 | B2 * | 7/2009 | Jarisch et al. | 99/289 R |
| 2003/0071056 | A1 * | 4/2003 | Hale | 222/83 |
| 2005/0106288 | A1 | 5/2005 | Blanc et al. | |
| 2006/0230941 | A1 * | 10/2006 | Ryser | A47J 31/3633 99/275 |
| 2007/0104837 | A1 * | 5/2007 | Yoakim et al. | 426/77 |
| 2009/0158938 | A1 * | 6/2009 | Jarisch | A47J 31/3638 99/289 R |
| 2010/0101428 | A1 * | 4/2010 | Fin | 99/295 |

FOREIGN PATENT DOCUMENTS

| | | |
|---|---|---|
| EP | 0867142 | 9/1998 |
| EP | 1510160 | 3/2005 |
| EP | 1859713 | 11/2007 |
| FR | 2713905 | 6/1995 |
| FR | 2745995 | 9/1997 |
| WO | WO 0038558 | 7/2000 |
| WO | WO 2008142040 | 11/2008 |

OTHER PUBLICATIONS

PCT/ISA/237 Written Opinion issued on PCT/EP2011/058390 (pp. 7).
English translation of Written Opinion dated Nov. 27, 2012 issued in corresponding International Appln. No. PCT/EP2011/058390.

* cited by examiner

*Primary Examiner* — Dana Ross
*Assistant Examiner* — Ket D Dang
(74) *Attorney, Agent, or Firm* — The Farrell Law Firm, P.C.

(57) ABSTRACT

Provided is a system for making beverages that includes an infusion chamber with first and second chamber portions, one of which is movable, an actuator that controls closure of the infusion chamber, a closure device that includes upstream and downstream closures to allow or prevent the dose to enter the infusion chamber. The system includes at least an incoming fluid pipe that supplies the infusion chamber with fluid to be infused, with the first chamber portion interconnected to the actuator.

15 Claims, 14 Drawing Sheets

SYSTEM FOR MAKING BEVERAGES BY INFUSING

PRIORITY

This application is a U.S. National Phase application of International Application No. PCT/EP2001/058390 filed May 23, 2011, claiming priority to Application No. 1054009 filed with the French Industrial Property Office on May 25, 2010, the contents of each of which incorporated herein by reference.

TECHNICAL FIELD OF THE INVENTION

The present invention concerns a device for making beverages by infusing a product with a dosage form.

It finds its application more particularly in the field of espresso-type coffee machines. It may also be used to make other beverages such as tea.

STATE OF THE ART

Many coffee machines now use doses that form a relatively compact infusion product.

Generally, the beverage preparation machine comprises an infusion chamber designed to receive hot water and a dose of product to be infused. The reliability of the insertion of the dose and its removal from the infusion chamber may pose many difficulties.

Document WO2008142040 proposes a particularly high reliability machine. This high reliability results essentially from a sequential operation of the machine relying on a number of specific parts and a very specific kinematics.

This machine has proved to be generally satisfactory. However, in a context where the consumers are looking for higher taste quality, it would be desirable to constantly improve the quality of the resulting beverage while improving the reliability of machines.

SUMMARY OF THE INVENTION

The invention aims to achieve at least one of these objectives. For this purpose, the invention provides a system for making beverages by infusing a dose of a product to be infused comprising:
  an infusion chambre designed to receive a dose, the infusion chamber being defined by at least a first and a second chamber portions, the chamber portions being arranged so as to move apart from one another or come together in order to respectively close or open the infusion chamber,
  an actuator arranged so as to control the closure of the infusion chamber, the first chamber portion being interconnected to the actuator,
  supply means of the infusion chamber,
  a closure device comprising upstream closure means arranged so as to selectively prevent or allow the dose to enter the infusion chamber,
  the closure device being arranged so as to pass alternatively:
    from a first position in which the upstream closure means prevent the dose from entering the infusion chamber,
    to a second position in which the upstream closure means allow the dose to enter the infusion chamber,
  the system comprises at least an incoming fluid pipe configured to supply the infusion chamber with fluid to be infused.

The system is characterized in that the first chamber portion interconnected to the actuator comprises at least partially said incoming fluid pipe.

Therefore, the incoming fluid pipe of the chamber and the actuator of the chamber are distributed on the same side of the infusion chamber. The second chamber portion is not associated to an actuator of a fluid supply. It can be connected only to the frame. The dimension between the infusion chamber and a front face of the machine can be significantly reduced. The path which the infused fluid runs through at the outlet of the infusion chamber before reaching a cup placed at the front face of the machine is thus also shortened.

However, during the development of the present invention, it turned out that the distance between the infusion chamber and the cup sufficiently impacts the temperature of the fluid to be infused to change the quality of the resulting beverage. Particularly it turned out that a long distance tends to break the foam usually formed on the surface of a coffee. In addition, this distance makes it difficult to control the temperature of the beverage upon its arrival into the cup. However, the taste perception of an infused beverage, such as a coffee, depends largely on the temperature during the tasting.

The present invention thus provides a structure that allows to better control the quality of the resulting beverage while providing high operation reliability.

In addition, the length of the pipe between the chamber and the cup increases the heat transfers between the beverage and the machine. The colder the pipe is, the more the heat transfers are. However, when several coffees are made in a short time interval and the pipe heats, the heat transfers are thereby reduced.

Therefore, the heat transfers vary greatly depending on the use of the machine, which prevents a good repeatability of the quality of the resulting beverage. By reducing the length of the discharge pipe, the invention allows thus to reduce the heat transfers and helps therefore to improve the repeatability of the quality of the resulting beverage without reducing the operation reliability.

Optionally, in addition, the present invention further comprises at least one of following features:
  The other chamber portion which does not have said incoming fluid pipe is fixed. It is fixed relative to a frame of the machine. The kinematics of the machine is therefore significantly simplified, reliable and robust. Moreover, the actuation of the chamber and the closure device are housed in a small space.
  The closure device comprises downstream closure means arranged so as to selectively prevent or allow the dose to exit the infusion chamber.
  In the first position, the closure device is arranged so that the downstream closure means allow the dose to exit the infusion chamber.
  In the second position, the closure device is arranged so that the downstream closure means allow to receive the dose introduced into the infusion chamber and prevent the latter from exiting the infusion chamber.
  The closure device is arranged so that the position of the upstream closure means conditions the position of the downstream closure means.
  The closure device is arranged so that the position of the downstream closure means conditions the position of the upstream closure means.
  The incoming fluid pipe is connected to a supply device comprising a boiler located upstream of the infusion chamber. Advantageously, it comprises also a pump located upstream of the boiler.

Advantageously, the upstream closure means and the downstream closure means are interconnected to each other. The kinematics of the system is therefore significantly simplified, reliable and robust. Particularly, the risks of poor positioning of the upstream closure means relative to the downstream closure means are reduced. In a preferred configuration, the closure device is separate from the first and second chamber portions. It is a single piece having the upstream closure means and the downstream closure means.

The system is configured so that the closure device is capable of translating along a main direction, and in that the upstream closure means and the downstream closure means are arranged so as to have a mutual offset in said main direction.

The closure device comprises a guide arranged to guide the closure device in its alternative movement when the closure device translates between the first and the second positions. This feature allows to further improve the robustness and reliability of the system.

The closure device is configured to translate along an axis of displacement and comprises a pair of ends of travel moving stop distributed on each side of said axis of displacement, each pair of the ends of travel moving stop being configured to cooperate with a drive finger so that longitudinal movement of the drive finger drives the closure device to translate.

The actuator is a hydraulic cylinder. Advantageously, it comprises a pomp configured to drive the hydraulic cylinder and to supply the boiler.

The hydraulic cylinder and the incoming fluid pipe are arranged on the same side of the infusion chamber.

The hydraulic cylinder comprises a piston and a cylinder defining with the piston a thrust chamber and return means, the hydraulic cylinder being arranged so that the introduction of a pressurized fluid into the thrust chamber causes the deployment of the hydraulic cylinder and so that the return means tend to retract the piston.

The piston comprises a passage communicating on the one hand with the incoming fluid pipe of the first chamber portion, and on the other hand with a supply channel for being connected to a boiler.

The cylinder comprises fitting means interconnected to the cylinder, extending in the thrust chamber, configured to slide within the piston, and housing the supply channel. Thus, the supply channel is practiced in the fitting means.

Advantageously, the fitting means and the passage have complementary shapes so that the fitting means slide within the passage for guiding at least partially the piston. In a preferred configuration, the fitting means are formed by a shaft. Seals are provided on the shaft and/or within the passage for ensuring the leaktightness between the passage and thrust chamber.

In that the cylinder comprises a bottom facing the piston and the longitudinal walls extending from the bottom in order to define with the piston the thrust chamber and wherein the transverse walls are formed for guiding at least partially the piston.

The second chamber portion comprises a discharge pipe arranged so as to conduct the infused beverage outside the system towards a space for collecting the infused beverage. Typically, the collecting space is configured to accommodate a cup.

The system comprises a receiving surface configured to accommodate a container utilised for collecting the infused beverage, the second chamber portion being placed between the infusion chamber and the receiving face. In a preferred configuration, the infusion chamber comprises two chamber portions. The first chamber portion is movable and the second chamber portion is fixed and interconnected to a frame of the system. The second chambre portion is made of a thermally insulating material, preferably plastic.

The upstream closure means are interconnected to the downstream closure means.

The system comprises guiding means arranged so as to guide the dose to be introduced into the infusion chamber and to maintain it at a location facing the infusion chamber when the upstream closure means is removed, the guide means being interconnected to the frame of the system. Thus, with the system according to the invention, the guiding means are not movable. The system complexity is reduced and thus the system reliability is improved. This simplification also tends to reduce the cost of manufacturing and maintenance.

The system comprises a trap door forming an opening placed upstream of the upstream closure means and in that the closure device comprises obstructing means arranged so as to:
leave the opening formed by the trap door unobstructed when the closure device is placed in the first position, and to
obstruct the opening of the trap door when the closure device is placed in the second position.

According to another purpose of the invention, a machine for making beverages comprising a system according to any one of the above features.

BRIEF DESCRIPTION OF THE FIGURES

Other characteristics, aims and advantages of this invention will be illustrated in the following detailed description and appended drawings which are given as non exhaustive examples and on which:

FIGS. 1 to 14 illustrate a system 10 for making a beverage according to the invention.

DETAILED DESCRIPTION OF THE INVENTION

Figure 1:
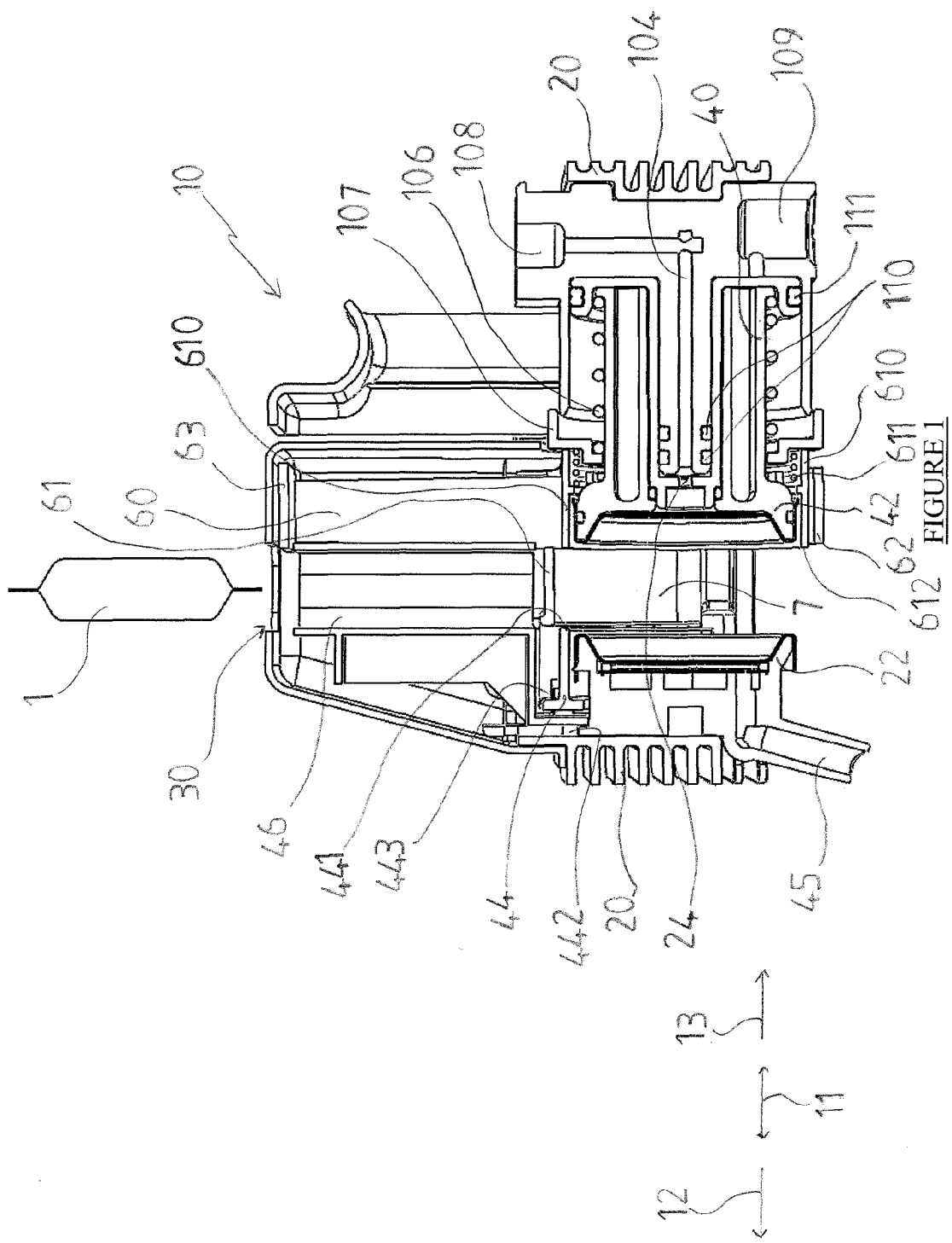
FIGS. 1 to 10 are longitudinal sections of the system shown in FIG. 1 and showing the various stages of the production process during the machine operation.

In the present description, we will refer to as upstream and downstream the portions of space that are respectively placed before and after a given point relative to the normal path of a dose 1 in the machine during a preparation cycle for a beverage.

The present invention uses doses of the type presented on FIGS. 1 to 10 and described in document WOA9507041, although this example is not restrictive. In these figures, the infused product, for example ground coffee, is enclosed in an inner volume of the dose 1 consisting of the assembly of layers joined at their circumferential border. Advantageously, the present invention can use a variety of doses. In particular, this does not imply that the circumferential border of the dose 1 has to be rigid. More generally, the invention is applied to any type of dose. It is applied to doses of type capsule with a flexible or rigid outer shell. It is also applied to doses with outer shells which are capable of disappearing at least partially during the infusion, by dissolving for example. It is also applied to doses formed of a product to be infused, the product being aggregated by a binder and/or by applying a pressure. Such a dose, formed of an aggregate of a product to be infused such as coffee, can be made outside of the machine or be constituted by a dedicated module of the machine.

The system 10 according to the invention has an infusion chamber 7 designed to receive a dose 1. The infusion chamber 7 comprises two chamber portions arranged to be apart or brought together mutually by an actuator in order to respectively close or open the infusion chamber 7.

The terms "half chamber" or "chamber portion" are utilized for naming portions capable of being placed in contact one with the other or in contact with a dose 1 in order to create a leaktight volume acting as the infusion chamber 7. The invention does not imply that the two chamber portions present any symmetry with one another.

In the embodiment given as the example, one of the two chamber portions, designated hereafter as a first chamber portion 42 or a movable portion 42, is carried by an actuator allowing the two chamber portions to move closer and away from each other. The other chamber portion, designated hereafter as a second chamber portion 22 or a fixed portion 22, is interconnected to a frame 20 of the machine. Each one of the chamber portions has one end that defines a circumference border contained in a plane that is substantially perpendicular to a longitudinal axis 11.

Hereafter, the longitudinal axis 11 or the longitudinal direction 11 will be designated as the direction comprising the main direction of the actuator 40. A forward direction 12 is the direction according to the longitudinal axis 11 along which each of the two chamber portions come together. A backward direction 13 is the direction according to the longitudinal axis 11 along which the two chamber portions move apart. The longitudinal direction 11, the forward direction 12 and the backward direction 13 are illustrated in FIG. 1.

In the context of the embodiment shown as an example, the first chamber portion 42 has an incoming fluid pipe 24 connected to fluid supply means which provide fluid, typically hot water, to be infused. Conventionally, the supply means form a hot water circuit comprising a tank, a boiler for heating the water of the tank until the required temperature for its infusion in the infusion chamber 7 is reached, and a pump for increasing the water pressure in the circuit. During the infusion, the two chamber portions 42, 22 are kept firmly in contact one with the other and define the volume receiving the dose 1. Leaktightness can be achieved by attaching the circumference of the two chamber portions onto the circumferential border of the dose 1 which then acts as a seal. Leaktightness can also be achieved or reinforced by using additional sealing means.

The second chamber portion 42 comprises a discharge pipe 45 communicating on the one hand with the inside of the infusion chamber 7, and on the other hand with a beverage discharge outlet. This discharge pipe 45 is designed to discharge the beverage made by infusing the dose 1 and then placed into a container such as a coffee cup.

After the infusion, when the first chamber portion 42 is being apart from the second chamber portion 22, the infusion chamber 7 is open and the infused dose 1 is no longer enclosed in the infusion chamber 7. The dose 1 then falls by gravity from the infusion chamber 7 into the collecting tray.

In a particularly advantageous configuration, the system is configured so as to the fluid supply means of the infusion chamber 7 and the actuator of the infusion chamber 7 are placed on the same side of the infusion chamber 7. In an even more advantageous configuration, the supply means and the actuator are placed behind the infusion chamber 7.

Therefore, no supply member of the chamber or actuation member should be positioned in front of the second chamber portion 22. The front face of the second chamber portion 22 is interconnected to the frame. The second chamber portion 22 can also be positioned closer to a front face of a machine equipped with the system according to the invention. By using a face of the front face of the machine, the user can interact with the machine for making a beverage. Typically, the front face of the machine comprises a collecting space for collecting the infused beverage. This collecting space, not shown in the figures, is for example a plane for placing a cup.

The distance between the infusion chamber 7 and the front face of the machine is shortened, and the discharge pipe 45 can also be limited. In particular, the invention allows not to use a long discharge pipe or a chute extension which is usually required for delivering the infused beverage into a cup. A long discharge pipe or a chute extension is usually required so that the user sees his cup without being obscured by a part of the machine. This positioning of the cup sufficiently in front of the machine is necessary in practice in order to well position the cup and to check the fill level and enjoy the flow of the beverage.

By shortening the distance between the infusion chamber and the front face of the machine, the invention allows to shorten the distance between the cup and the infusion chamber 7. The heat losses during the delivery of the beverage are thus reduced, and the quality of the resulting beverage is therefore improved.

In addition, the repeatability of the quality is improved since the heat losses during the beverage delivery are only slightly different depending on the use of the machine.

Furthermore, the size of the machine is reduced.

In a preferred configuration, the actuator driving the first chamber portion 42 is a hydraulic cylinder 40. The hydraulic cylinder 40 comprises a piston. The first chamber portion 42 is carried by the piston of the hydraulic cylinder 40. The cylinder of the hydraulic cylinder 40 comprises a bottom 102 facing the thrust surface 101 of the piston. The bottom 102 of the hydraulic cylinder 40, its longitudinal walls and the thrust surface 101 define a thrust chamber 100. This thrust chamber 100 is connected to a thrust fluid inlet 109 designed to be connected to the pump. The activation of the pump makes the thrust chamber 100 be pressurized, which drives the piston to move towards the front 12 and relatively away from the base 102 of the cylinder.

The system comprises return means of the hydraulic cylinder 40. These return means include a return spring 106 configured to ensure the return towards the rear 13 of the piston in a retracted position when the pressure inside the thrust chamber 100 drops. The return spring 103 works in compression and extends longitudinally. In a preferred configuration, it is cylindrical and surrounding the piston. It leans upstream on the piston and downstream on a stop 107 which is interconnected to the frame.

The cylinder comprises fitting means 103 salient from the bottom 102 and extending towards the piston. The piston comprises a housing extending from the thrust surface 101. The housing and the fitting means 103 are arranged so that the fitting means 103 penetrate deep into the housing during the return of the hydraulic cylinder 40 in a retracted position.

Whatever the position of the piston is, the downstream end of the fitting means 103 is inserted into the housing of the piston. Seals 110 placed between the piston and the fitting means 103 provide continuously the leaktightness of the passage 105.

The fitting means 103 include an inner supply channel 104. An upstream end of the supply channel 104 is fluidly connected to a fluid inlet 108 connected to the boiler. A downstream end comes out into a passage 105 formed by the housing. This passage 105 comes out downstreams into the incoming fluid pipe 24 carried by the first chamber portion 42 and supplying fluid to the infusion chamber 7.

Therefore, during the deployment of the hydraulic cylinder 40, the piston moves away from the bottom 102 of the cylinder and the passage 105 expands. Conversely, the passage 105 becomes shorter when the hydraulic cylinder 40 is retracted. Whatever the position of the piston is, the infusion chamber 7 is always fluidly connected to the supply channel 104.

Advantageously, the fitting means 103 helps in guiding the piston. Preferably, guiding the piston is also provided through the operation between the longitudinal walls of the cylinder and the piston. At least a seal 111 is placed between the longitudinal walls of the cylinder and the piston to ensure the leaktightness of the thrust chamber 100.

In a preferred configuration, the fitting means 103 define a shaft passing through the center of the cylinder.

The system 10 also comprises a closure device 60. This closure device 60 comprises downstream closure means 62 and upstream closure means 61. It is separate from each of the chamber portions 22, 42 which form the infusion chamber 7.

The downstream closure means 62 are placed downstream of the infusion chamber 7. They are arranged so as to form a retractable stop for a dose 1 being introduced into the infusion chamber 7.

In a non-retracted position, when open, the downstream closure means 62 receive a dose 1 being introduced into the infusion chamber 7 and prevent this dose 1 falling by gravity towards the downstream of the infusion chamber 7.

In this position, the downstream closure means 62 also prevent any entry into the infusion chamber 7 from the downstream of the latter. Thus, this prevents the user from, for example, inserting his fingers into the infusion chamber 7.

In a retracted position, the downstream closure means 62 do not form a stop for blocking a dose 1 introduced in the infusion chamber 7 and allow therefore the dose 1 to drop out when opening the infusion chamber 7.

The upstream closure means 61 are arranged to play a role as retractable stop. They are placed upstream of the infusion chamber 7.

In a non-retracted position, the upstream closure means 61 prevent access to a dose 1 or to any other element in the infusion chamber 7 from upstream of the latter. In this non-retracted position, the upstream closure means 61 also ensure the dose 1 to be received and help to retain the dose 1 in position in the system 10.

In a retracted position, the upstream closure means 61 allow a dose 1 to be inserted into the infusion chamber 7 from upstream of the latter.

The system 10 is arranged to pass the closure device 60 alternately from a first position in which the upstream closure means 61 prevent a dose 1 from entering the infusion chamber 7, and the downstream closure means 62 ensure that no already-used dose 1 remains in the infusion chamber 7, to a second position in which the upstream closure means 61 allow a dose 1 to enter the infusion chamber 7 and the downstream closure means 62 allow the dose 1 to be received and retained in the infusion chamber 7.

The closure device 60 is arranged so that the position of the upstream closure means 61 conditions the position of the downstream closure means 62, and the position of the downstream closure means 62 conditions the position of the upstream closure means 61.

Thus, for a given position of the upstream closure means 61, the downstream closure means 62 may only adopt a single position and vice versa. Therefore, the system operates sequentially.

The invention reduces thus significantly the risks of the system jamming, notably due to the dose getting caught up in the mechanical parts. This reduces the number of interventions required by a user or a repairer. It also protects the integrity of the dose 1. Moreover, it prevents a dose introduced into the machine from falling directly into the collecting tray without being first received by the infusion chamber.

The upstream closure means 61 and the downstream closure means 62 are interconnected to each other. This feature simplifies the kinematics, improves sturdiness, limits the fabrication costs and the number of defects of the system 10. The closure device 60 forming a single piece defines thus a ring.

Figure 11:
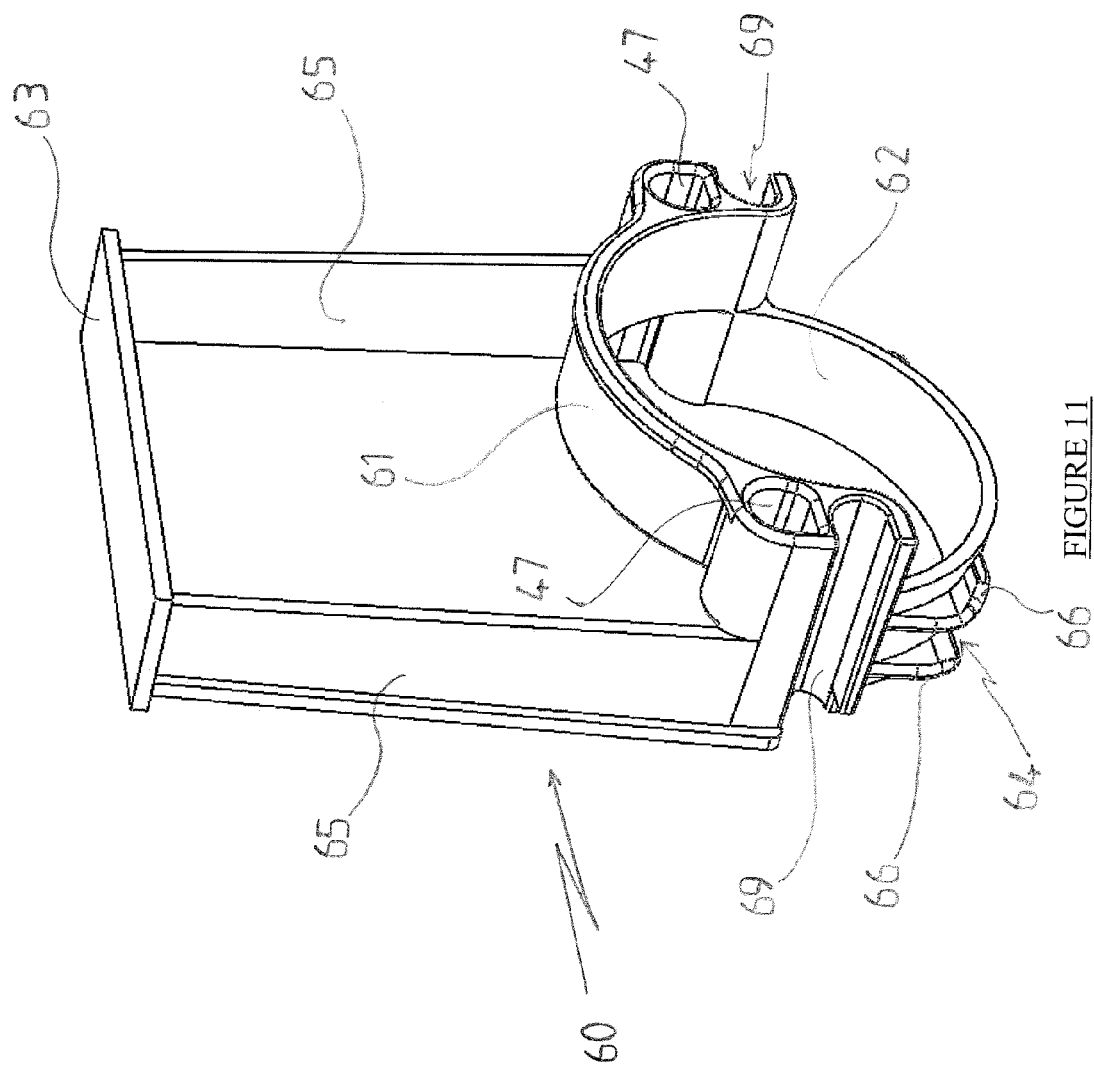
FIGS. 11 and 12 are views in perspective of the front and the rear of a ring forming closure means according to a certain example of the invention.
Figure 12:
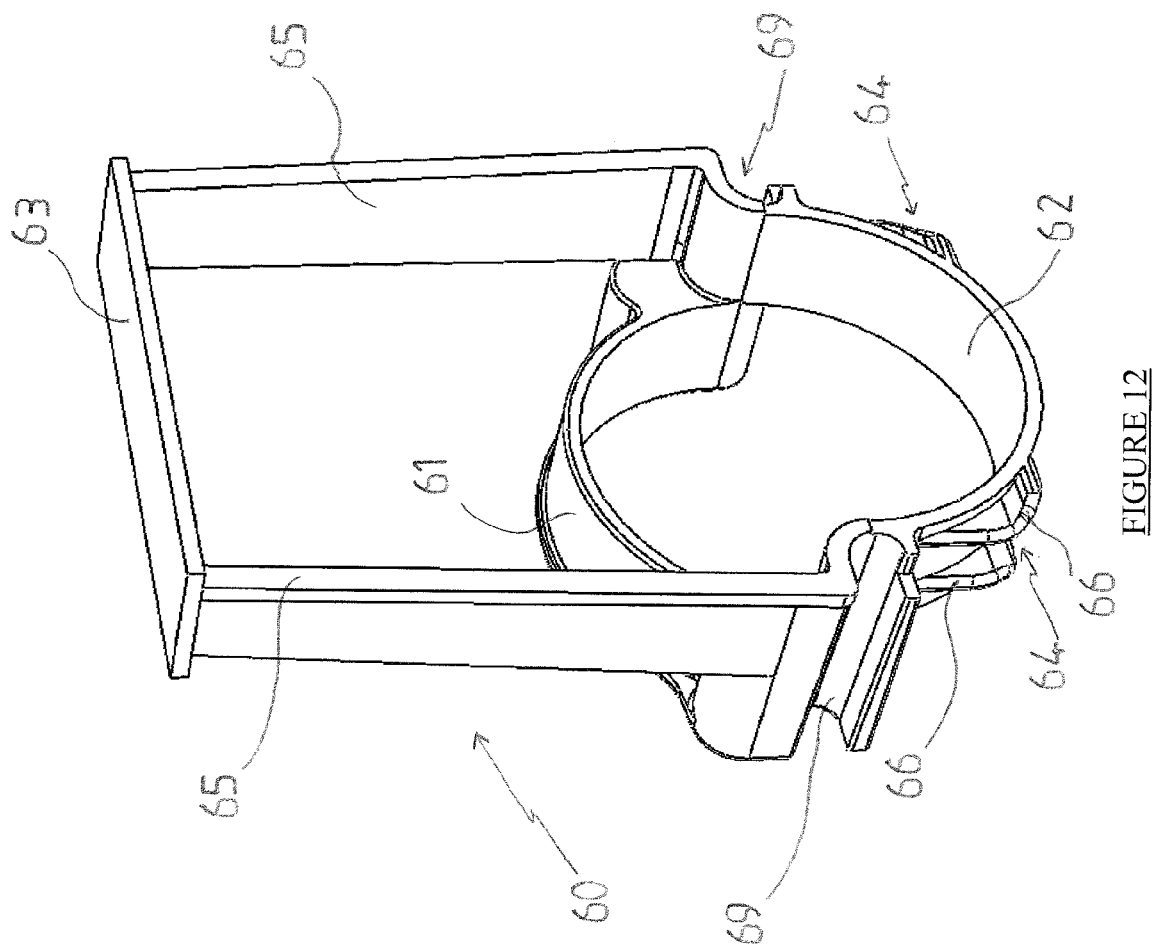
Figure 13:
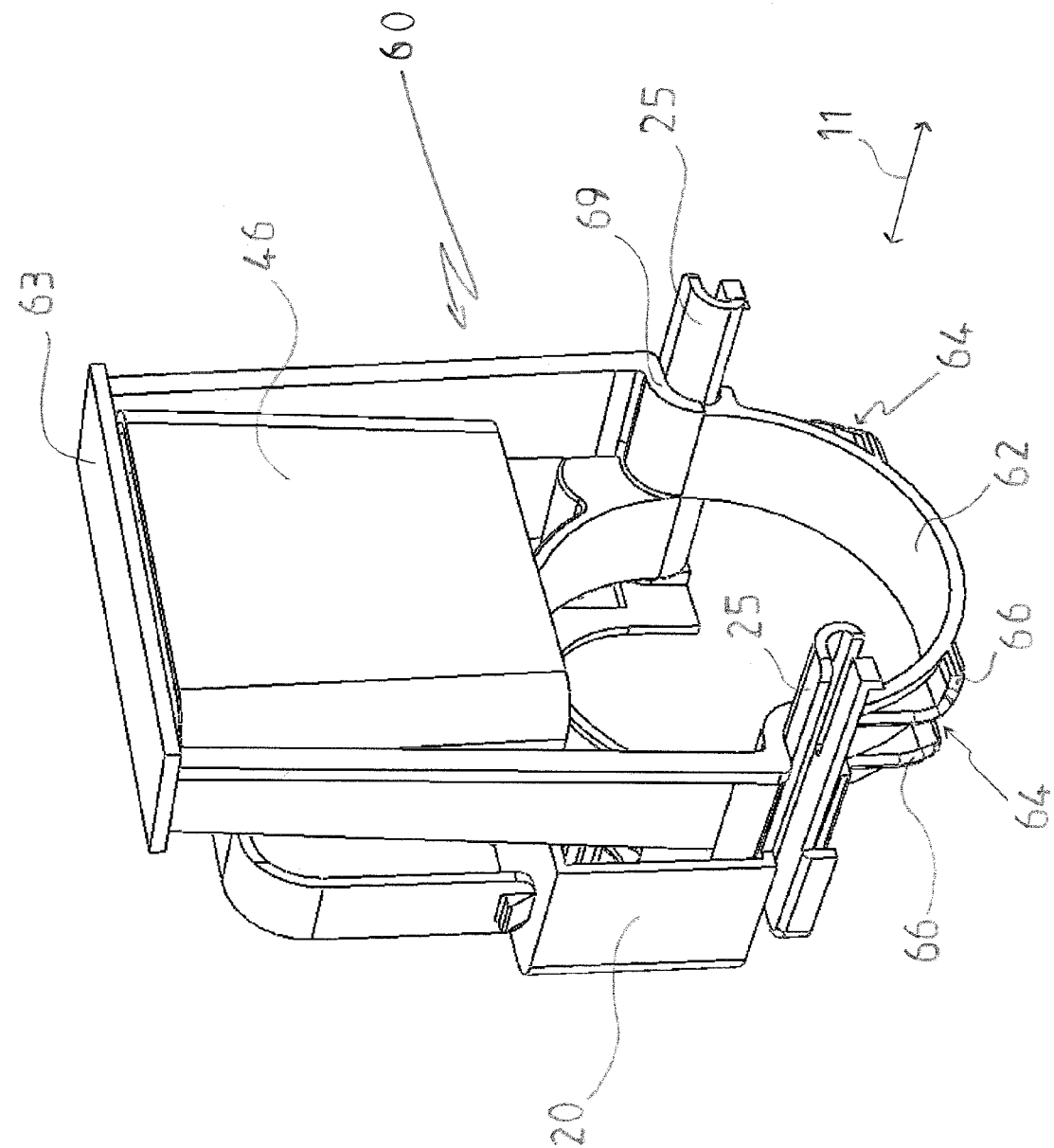
FIGS. 13 and 14 shows the sliding of the ring illustrated in FIGS. 11 and 12 regarding the guiding means.
Figure 14:
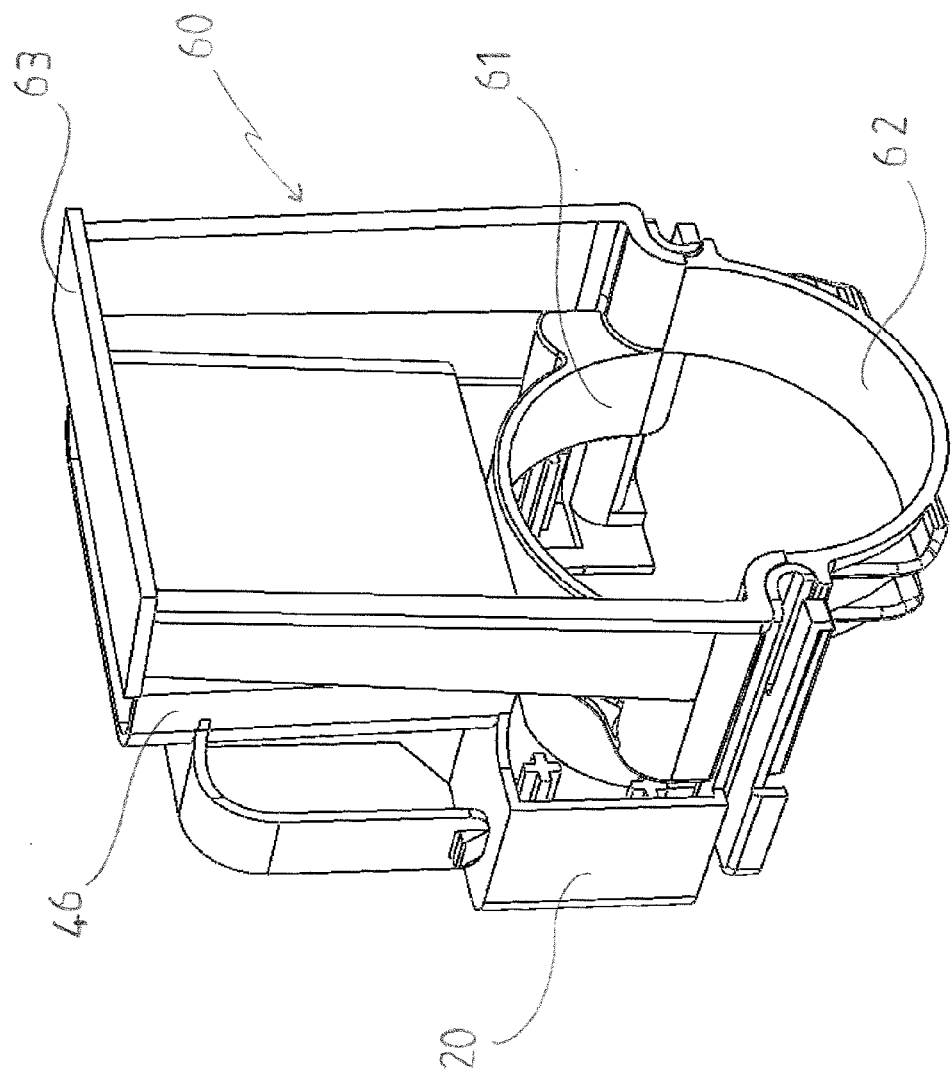

FIGS. 11 and 14 detail the closure device 60 according to this embodiment. This closure device 60 comprises:

a guide arranged so as to guide the closure device 60 in its alternating movement between the first and the second position. In a preferred configuration, the guide comprises two slides 69 capable of guiding the closure device 60 to translate along two shafts 25, 25 carried by the frame 20 of the system 10 and extending along two guiding axes parallel to the longitudinal axis 11, two arms 65, 65 each of which extends from its respective slide 69 in a direction substantially perpendicular to the guidance axis, upstream closure means 61 arranged so as to act as a stop for a dose 1 located upstream of the infusion chamber 7 when the closure device 60 is in the first position. In an advantageous configuration, the upstream closure means 61 have the shape of a part of a crown, each end of which joins one of the arms 65, 65 and which is centred on an axis parallel to the guiding axes, downstream closure means 62 arranged so as to act as a stop for a dose 1 located downstream of the infusion chamber 7 when the closure device 60 is in the second position. Advantageously, the upstream closure means 62 have the shape of a part of a crown, each end of which joins one of the two arms 65, 65 and which is centred on an axis parallel to the guiding axes.

In addition, the upstream closure means 61 and the downstream closure means 62 are arranged so as to be offset relative to one another along the main direction of movement of the closure device 60. Thus, in the second position, the upstream closure means 61 are placed substantially in front of the second chamber portion 22, and the downstream closure means 62 are placed substantially behind the second chamber portion 22. In the first position, the upstream closure means 61 and the downstream closure means 62 are placed substantially behind the second chamber portion 22.

The sizes of this offset are selected so that:

when the closure device 60 is in the first position, the upstream closure means 61 prevent a dose 1 from entering the infusion chamber 7, and the downstream closure means 62 allow an used dose 1 to exit the infusion chamber 7, when the closure device 60 is in the second position, the upstream closure means 61 allow a dose 1 to enter the infusion chamber 7, and downstream closure means 62 allow a dose 1 to be received and to ensure the dose 1 to be introduced into the infusion chamber 7.

Thus, in this example, the closure device 60 is fitted to slide along the longitudinal axis 11, the upstream closure means 61 and the downstream closure means 62 are offset relative to one another along the longitudinal axis 11. The upstream closure means 61 are placed in front of the downstream closure means 62 along this same axis.

The system 10 comprises actuating means allowing alternating the passage from the first position to the second position. In fact these are the same actuating means that act on both the upstream closure means 61 and the downstream closure means 62.

Consequently, the system 10 considerably reduces the risks of the packages jamming in the mechanism. In particular, the system 10:

prevents a dose 1 introduced into the system 10 from falling directly into the collecting tray without infusion having taken place. In fact, the infusion chamber 7 is either plugged upstream by the upstream closure means 61 or downstream by the downstream closure means 62 prevents that there may be two packages simultaneously exist in the infusion chamber 7.

The reduced number of actuators significantly limits the complexity of the structure of the system 10. This structure allows the kinematics of the bodies passing alternately from the first to the second position to be simplified. This reduces the size, the number of parts involved, the fabrication costs and the number of defects encountered.

At least an expanding spring, working preferably in compression, attempts to push the closure device 60 towards the first chamber portion 42 of the infusion chamber 7 and to approach the closure device 60 of the head of the hydraulic cylinder 40. The expanding spring repulses thus the closure device 60 towards the rear 13.

In a preferred configuration, we will size the expanding spring so that the jamming of the dose 1 between the closure device 60 and another element of the system 10 does not interfere with the integrity of the dose 1. Thus, we choose, for example a spring applying, on the closure device 60, a force equivalent to the total weight of the dose 1 plus the weight of the closure device 60 added at least by a third of said total weight. The elastic force of the spring is thus between 0.6 and 1.5 Newton.

Preferably, the closure device comprises two housings 47, 47. Each housing 47 is configured to accommodate an expanding spring. These housings 47 are shown in FIG. 11. The system is arranged so that each of the expanding spring leans on the one hand on a bottom of the housing 47, and on the other hand on a wall connected to the frame 20.

The front end of the shafts 25, 25 is connected to the frame 20.

The forward movement of the closure device 60 and the engagement of moving the closure device 60 in one direction or in the other direction will be described in detail in the following paragraphs.

The closure device 60 is driven by a drive device (not shown). This drive device comprises for example at least a drive finger cooperating with an end of travel moving stop 66 carried by the moving the closure device 60.

In a preferred configuration, as illustrated in FIGS. 11 to 14, the closure device 60 comprises a pair of ends of travel moving stop 66, 66 distributed on each side of the axis of displacement. Each pair of ends of travel moving stop 66, 66 is configured to accommodate a drive finger. The longitudinal movement of the drive finger drives the closure device 60.

The system 10 also comprises guiding means 46. These guiding means 46 have substantially the shape of a sleeve which is complementary to the shape of the section of the dose 1. They are arranged so as to prevent any significant movement of the dose 1 in the horizontal plane and allow its vertical movement. They play a role as hopper. This guiding means 46 are interconnected to the frame 20 and they are thus fixed. In a preferred configuration, they are mounted on the second chamber portion 22 or on a piece interconnected to the latter or to the frame 20. They are arranged so as to guide the dose 1 located upstream of the upstream closure means 61. Moreover, they are placed longitudinally so as to be positioned opposite the opening of the infusion chamber 7 in the second position in order to allow the insertion of the dose 1 into the latter when the upstream closure means 61 are retracted. More precisely, they are positioned opposite the downstream closure means 62 when the latter are in the second position. They guide the dose 1 and thus move the dose 1 down to the infusion chamber 7.

In addition, they are placed vertically so as to be close enough to the upstream closure means 61 in order to ensure that dose 1 is retained when the latter rests on the upstream closure means 61. Thus, when a dose 1 rests on the upstream closure means 61 and the latter translate forwards, the guiding means 46 help prevent any significant longitudinal translation of the dose 1. The latter is therefore retained opposite the opening of the infusion chamber 7 when the upstream closure means 61 are fully retracted. The relative movement of the closure device 60 and the guiding means 46 allow the dose 1 to be transferred from the upstream closure means 61 into the infusion chamber 7. Moreover, this relative movement protects the integrity of the dose 1 when the dose 1 is being transferred. The step of guiding the dose 1 is clearly illustrated in FIGS. 1 to 4.

By providing the fixed guiding means 46, the invention contributes to enhance the robustness and reliability of the system while maintaining the sequential nature of the operation.

Furthermore, these guiding means 46 maintain the dose 1 in position resting on the upstream closure means 61 in order to facilitate the insertion of this dose 1 into the infusion chamber 7. Optionally, the guiding means 46 have two appreciably parallel and vertical grooves that coact with the circumferential border of the dose 1 in order to help guide the dose 1.

The system 10 also comprises a trap door 30 forming an opening placed upstream of the upstream closure means 61 and downstream of the guiding means 46. The opening of the trap door 30 is placed longitudinally so that it is positioned opposite the guiding means 46. Hence, they are positioned opposite the upstream closure means 61 when the closure device 60 is in the first position. The opening formed by the trap door 30 can be accessed by an user and is designed to receive and introduce a dose 1 into the system 10.

The guiding means 46 is fixed relative to the trap door 30. The invention eliminates any risk of jamming of a dose or any other object such as a finger between the guiding means 46 and the trap door 30.

The closure device 60 comprises obstructing means 63 arranged so that:

the opening of the trap door 30 is plugged when the closure device 60 is in the second position, the opening of the trap door 30 remains free when the closure device 60 is in the first position.

The obstructing means 63 comprise an upper stop placed upstream of the upstream closure means 61, upstream of the guiding means 46 and downstream of the opening of the trap door 30. The upper stop extends from an arm 65 to the other closure device 60 and acts as a retractable stop for a dose 1. It is placed along the longitudinal axis 11, appreciably opposite the downstream closure means 62.

Thus, when the closure device 60 is in the first position, the dose 1 inserted into the opening of the trap door 30 has free access to the guiding means 46 and stops when reaching the upstream closure means 61.

When the closure device 60 is placed in the second position, the insertion of a dose 1 into the opening of the trap door 30 is stopped upstream of the guiding means 46 by the obstructing means 63. This dose 1 does not therefore reach either the upstream closure means 61, the downstream closure means 62 or the infusion chamber 7.

The obstructing means 63 prevent a dose 1 from being inserted when there is already another dose 1 in the upstream closure means 61 or in the infusion chamber 7.

Moreover, when the closure device 60 is in the second position, the obstructing means 63 prevent any access to the system 10 and this improves the overall safety of the machine. Indeed, in this position an user can not insert an object or his fingers inside the system 10.

Advantageously, the closure device 60 is formed from a single piece of material. The closure device 60 may be made of aluminium, stainless steel or plastic.

As mentioned previously, the system 10 has a pump that is designed to supply fluid to the infusion chamber 7. In the particular example, this pump also supplies the actuator, which allows to open and close the infusion chamber 7. In fact, the pump supplies a hydraulic circuit actuator of the hydraulic cylinder 40.

The pump is supplied with electricity from an electrical circuit equipped with a first and the second switch.

The first switch closes on an order from an user. Advantageously, a control button 92 is connected to the first switch and when operated closes it.

The second switch closes when the closure device 60 is placed in the second position. More precisely, the system 10 comprises slaving means arranged so as to operate the pump based on the position of the closure device 60. These slaving means act as a second switch and are equipped with a limit switch contactor interconnected to the frame 20, together with a contact finger arranged so as to coact with the contactor and carried by the closure device 60, or in a preferred configuration, carried by the drive device of the closure device 60. In the latter case, a same piece can have both the contact finger and the drive finger coacting with the ends of travel moving stop 66. The slaving means are arranged so that contactor and the contact finger are in contact one with the other and when the closure device 60 is placed in the second position. In this position, the contact finger rests on the contactor allows to close the electrical supply to the pump. In this position, the pump is supplied with electricity and is thus able to function. When the circuit is open, i.e. when the contactor is not pushed by the contact finger, the pump is unable to function. Thus, the operation of the pump is dependent on the appropriate position of the upstream closure means 61 and the downstream closure means 62.

Thus, the invention significantly improves the control of the relative position between the upstream closure means 61, the downstream closure means 62, the guiding means 46, and the two chamber portions 22 and 42. The likelihood of dysfunction of a system 10 is therefore considerably reduced.

More precisely, the system 10 improves significantly the user's safety. Indeed, if the trap door 30 is not obstructed by the obstructing means 63 and remains open due to the presence of any obstacle whatsoever, in particular fingers, the pump does not operate and the hydraulic cylinder 40 does not translate, nor can water injection into the infusion chamber 7 start. The operation of the system is therefore sequential and conditional.

Moreover, the slaving means also prevent the pump from operating when an obstacle in the lower part of the system 10 prevents the closure device 60 from adopting a correct position. Thus, when the collecting tray is full and a dose 1 which has been infused cannot be correctly ejected and prevents a proper operation of the closure device 60, the pump is unable to operate and the alarms may be activated. It is the same if a user inserts fingers through the downstream opening of the chamber. The hot water is not delivered to the chamber and the hydraulic cylinder is not actuated. The risk of burning or pinching fingers is avoided even in case of abnormal use of the system.

Furthermore, the invention also makes it possible to protect the integrity of a dose 1 present in the infusion chamber 7 when the closure device 60 is blocked. Indeed, operating the pump would lead to the dose 1 being crushed and wetted.

The system 10 comprises first stripping means 610 arranged so as to cause the separation between the dose 1 and the first chamber portion 42 after the infusion. Indeed, the firm contact between the dose 1 and the two chamber portions during the infusion and the bonding by suction effect of the wet surface on the infused dose 1 can prevent the dose from being ejected when the first chamber portion 42 moves away relative to the second chamber portion 22 and the downstream closure means 62 are withdrawn.

These first stripping means 610 have a general shape of a ridge extending substantially according to a crown shape. More generally, these first stripping means 610 are configured to be applied to at least a portion of the dose 1. The end of the ridge defines a stripping finger 612 configured to come into contact with the dose 1. In the illustrated example, the stripping finger 612 forms a circle configured to be applied to the circumferential border of the dose 1. It is formed by a sleeve mounted on the hydraulic cylinder with a mobility while translating along the axis of displacement of the hydraulic cylinder 40. A stripping spring 611 interposed between the frame 20 or the hydraulic cylinder 40 and the stripping finger 612 tends to repulse the latter beyond the front end of the first chamber 42. A stripping spring 611 intercalated between the frame 20 or the hydraulic cylinder 40 and the stripping finger 612 tends to repulse it to the latter beyond the front end of the first chamber portion 42. Therefore, these first stripping means 610 are arranged so as to come into contact with the circumferential border of the dose 1 and to move forwards the latter when returning towards the rear of the first chamber portion 42. Advantageously, the stripping spring 611 leans on a first face of a stop 107 interconnected to the frame 20, and a second face of this stop 107 serves as a stop to the return spring 106 which tends to retract the hydraulic cylinder 40.

Figure 9:
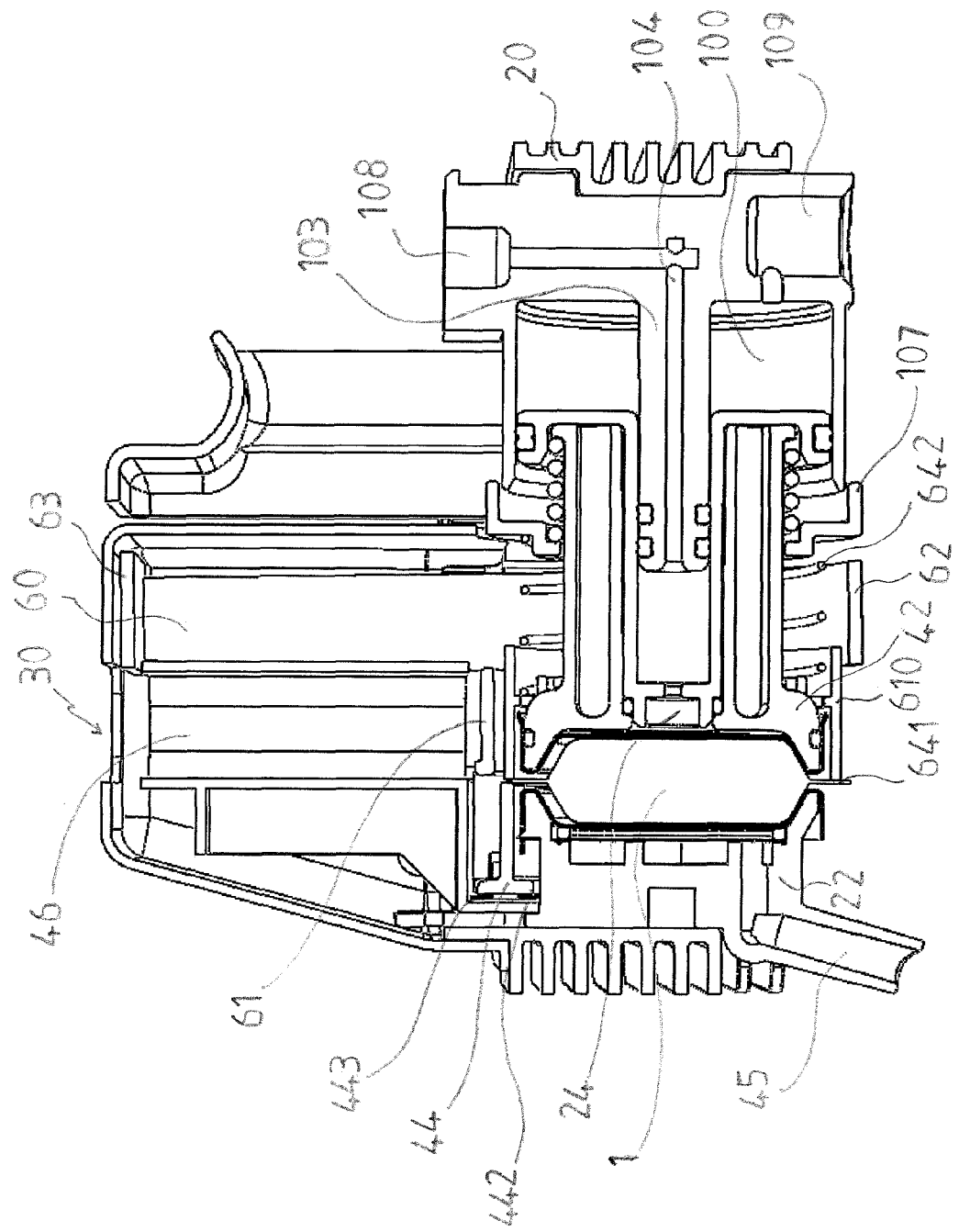

FIG. 9 illustrates the first stripping means 610 in pull-off position. The stripping finger 612 is placed in front of the first chamber portion 42.

Figure 8:
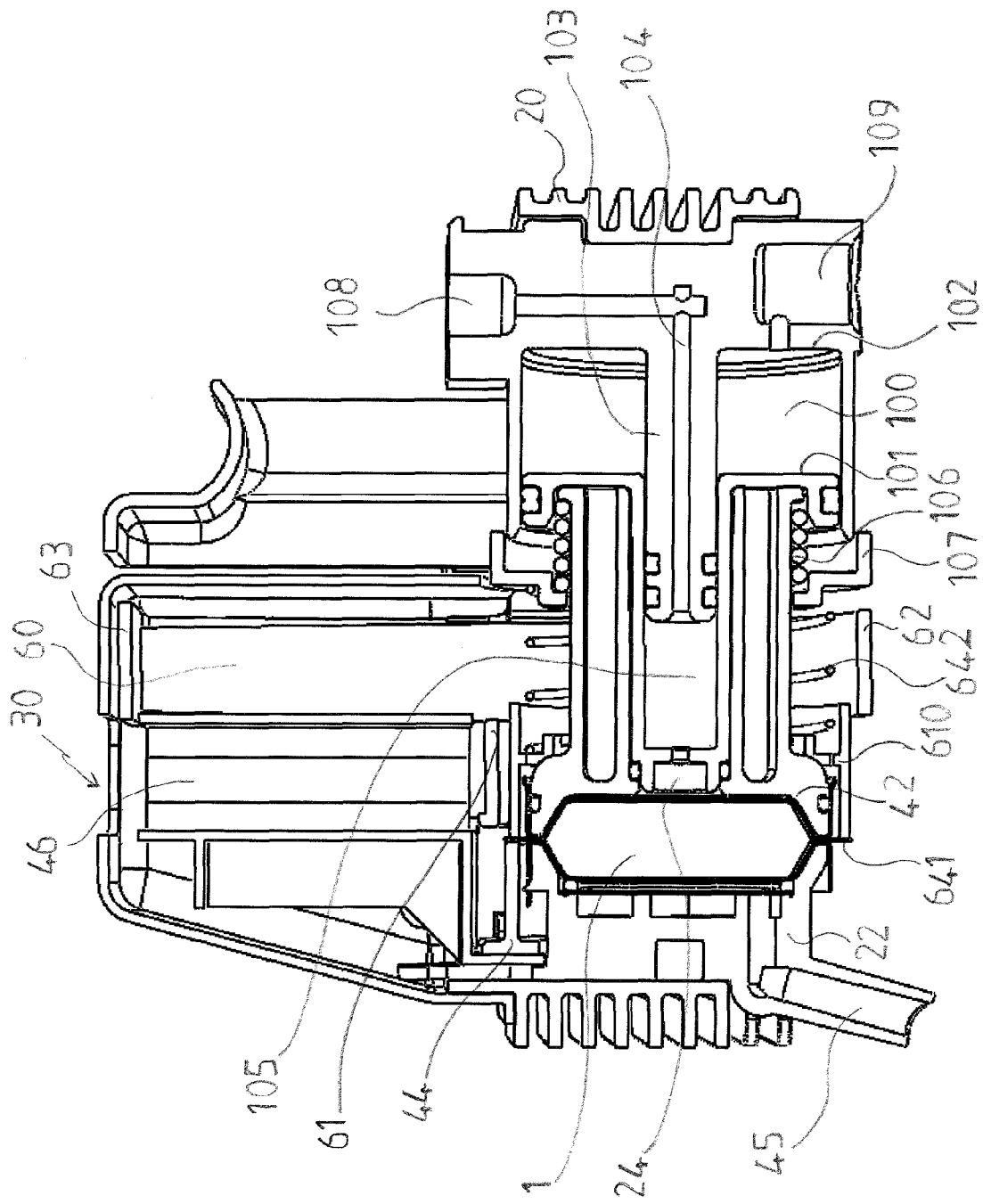

FIG. 8 illustrates the first stripping means 610 in a retracted position when the infusion chamber 7 is closed. In this position the first stripping means 610 are leaning on the circumferential border of the dose 1, or on the frame 20 in the absence of the dose 1, or, in a preferred configuration, on second stripping means 44 which will be detailed below.

These first stripping means 610 have a particularly simple structure and significantly contribute to improving the operation of the system 10.

The system 10 comprises also second stripping means 44 arranged so as to cause the separation between the second chamber portion 22 and the dose 1 after the infusion. These second stripping means 44 include a stripping finger 441 mounted by longitudinally sliding relative to the frame, and two stripping springs 442 installed symmetrically on either side of the axis 11 and intercalated between said stripping finger 441 and a part connected to the frame 20 of the system. These second stripping means 44 are arranged so as to repulse the stripping finger 441 backwards beyond the rear end of the second chamber portion 22 of the infusion chamber 7.

The stripping spring 442 acts in compression. The stripping finger 441 is defined by a crown portion surrounding the second chamber portion 22. When opening the infusion chamber 7, the stripping finger 441 is repulsed backwards and coming into contact with the dose 1, which causes the separation of the latter from the second portion 22 as shown in FIG. 9.

Advantageously, the stripping means 441 include a bearing surface 443 which is rotated opposite the closure means 30 and configured to be driven forwards by the closure device 60 when the latter comes in the second position. Therefore while closing the infusion chamber 7, the closure device 60 causes to compress the stripping spring 442 and to withdraw the second stripping means 44. This step is particularly illustrated in FIGS. 7 and 8.

This stripping spring 442 exerts a force on the dose 1 that is so small as not to damage the latter if jammed. For instance, this spring is designed to apply a force around 0.2 Newton.

For each of the stripping means 44, 660, the spring can be replaced with any elastic means.

The sequence of operations for preparing a beverage will be described below based on FIGS. 1 to 10.

At the start of the cycle, the hydraulic cylinder 40 is retracted. The head of hydraulic cylinder 40 is repulsed backwards by the return spring 106 of the hydraulic cylinder 40. The first chamber portion 42 is then apart from the second chamber portion 22 and the infusion chamber 7 is therefore open. The closure device 60 is placed in the first position. As a result:
    the upstream closure means 61 prevent access to the infusion chamber 7 from the upstream part of the latter,
    the downstream closure means 62 allow an already-infused dose 1 present in the infusion chamber 7 to be ejected by gravity,
    the obstructing means 63 allow free passage through the opening formed by trap door 30, Moreover, the front end of the first stripping means 610 is placed in front of the front end of the second chamber portion 42. The rear end of the second stripping means 44 is positioned behind the rear end of the second chamber portion 22. Thus, there is no already-infused dose 1 between the two chamber portions. This step is illustrated in FIG. 1.

Figure 2:
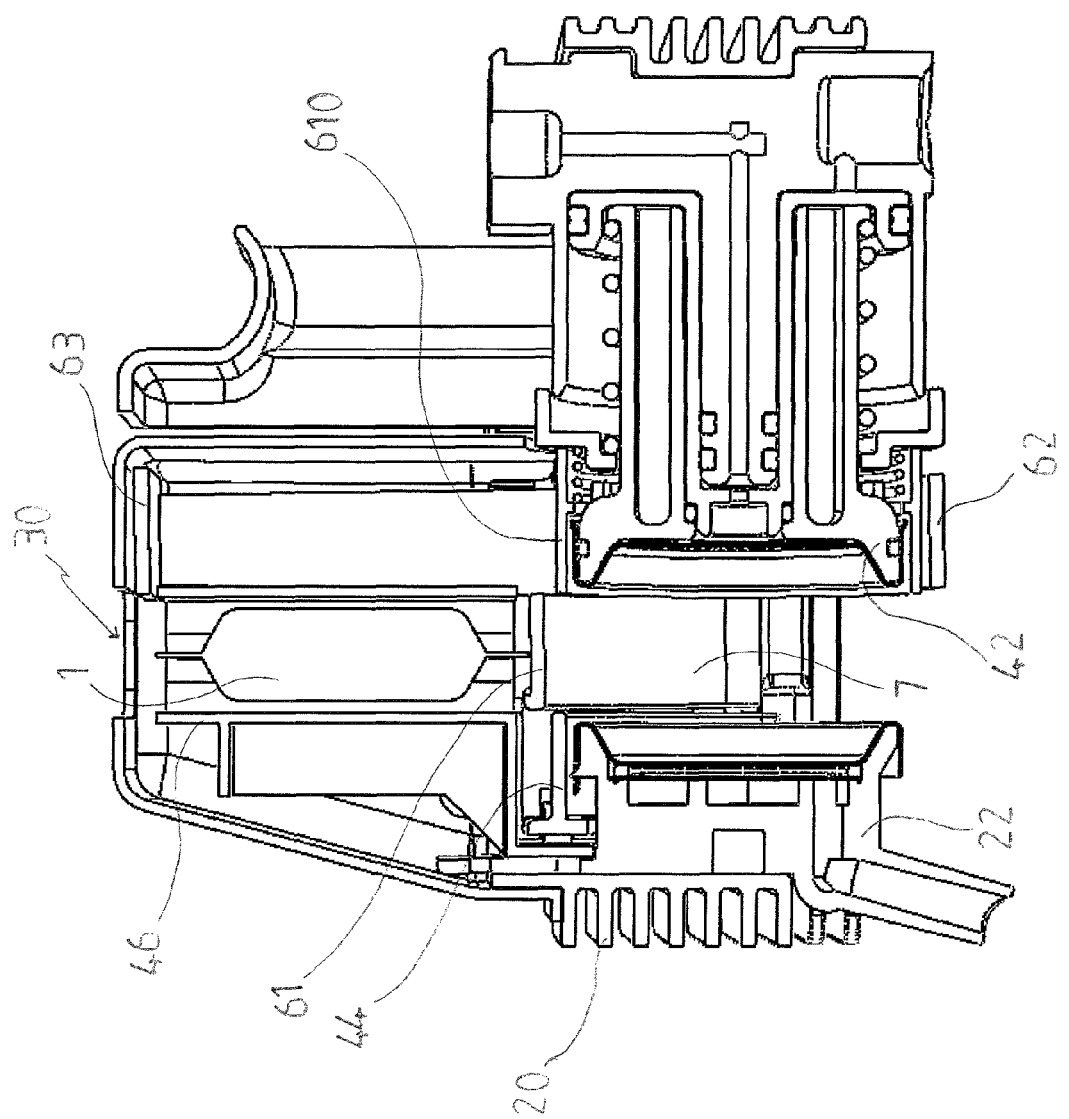

The user inserts a dose 1 in the opening of the trap door 30. This dose 1 falls by gravity while being guided and then maintained in the appreciably vertical position by the guiding means 46. The fall of the dose 1 is stopped by the upstream closure means 61 positioned opposite the opening of the trap door 30 and the guiding means 46. These upstream closure means 61 prevent the dose 1 from entering the infusion chamber 7. This step is illustrated in FIG. 2.

Figure 3:
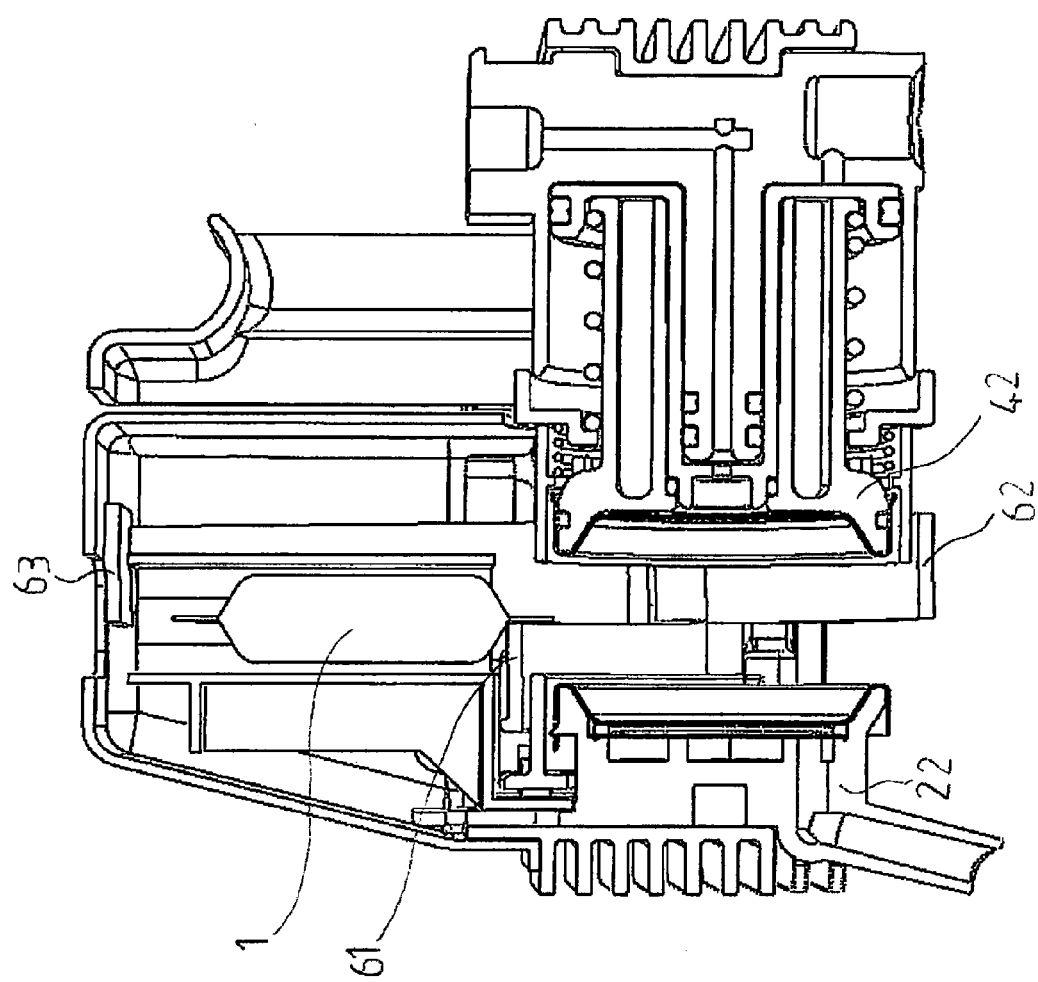
Figure 4:
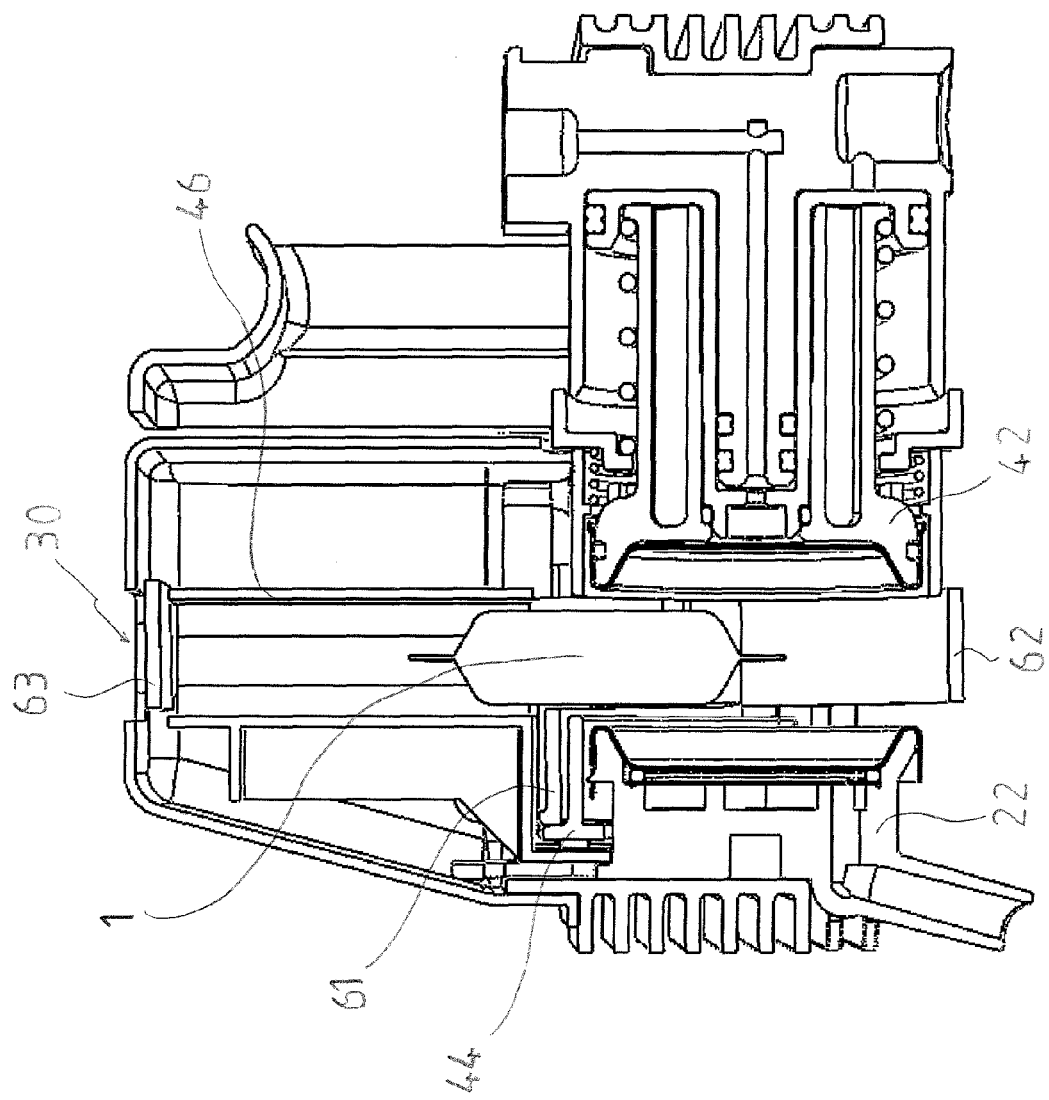
Figure 5:
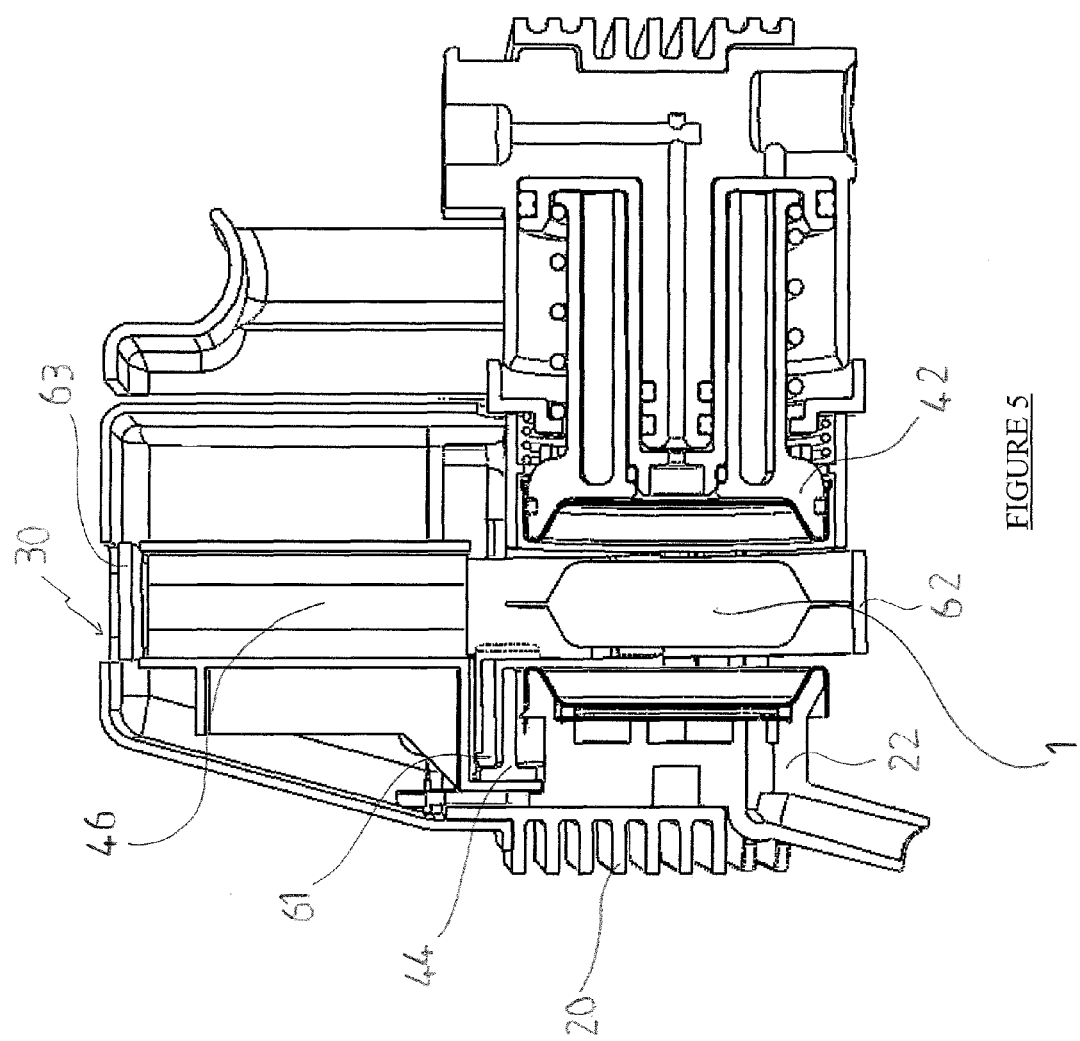

At a later stage previously illustrated in FIGS. 3 and 4, the user actuates the closure device 60. The latter is then free to slide forwards under the force exerted by the drive device (not shown) acting on the ends of travel moving stops 66, 66. During this movement, the upstream closure means 61 move forwards and the guiding means 46 remain fixed to the frame, thereby maintaining the dose 1 opposite the opening of the infusion chamber 7. Progressively as they move forwards, the upstream closure means 61 free the opening of the infusion chamber 7. Moreover, the downstream closure means 62 gradually obstruct the opening of the infusion chamber 7 downstream thereof. When the opening of the infusion chamber 7, now disengaged by the upstream closure means 61, has become large enough, the dose 1 falls by gravity into the infusion chamber 7 where it is received by the downstream closure means 62 forming a stop. This step is illustrated in FIGS. 4 and 5.

The forward movement of the closure device 60 continues until the closure device 60 comes into and stops with an element of the frame 20. Preferably, the closure device 60 comes into and stops with the second stripping means 44, which, while being withdrawn forwards, comes into and stops with the frame 20. This step is illustrated more specifically in FIG. 5. In this position, the closure device 60 is in the second position. In this position:
    the upstream closure means 61 allow access to the infusion chamber 7 from upstream of the latter,
    the downstream closure means 62 receive the dose 1 introduced into the infusion chamber 7,
    the obstructing means 63 obstruct the opening to the trap door 30, thereby preventing doses or any other object from entering through this opening of the trap door 30,
    the contactor is in contact with the contact finger and the slaving means to allow the pump to operate.

Figure 6:
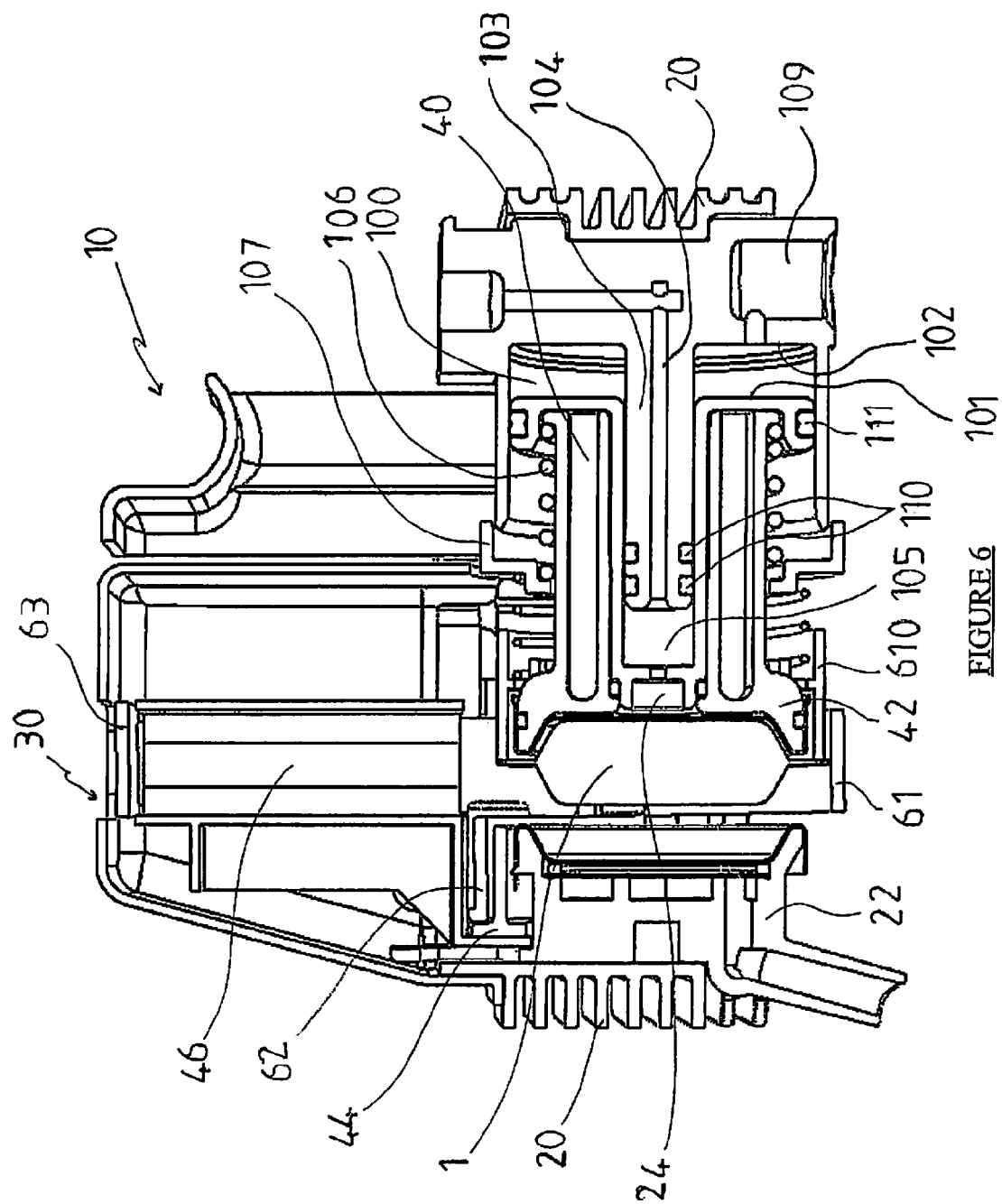
Figure 7:
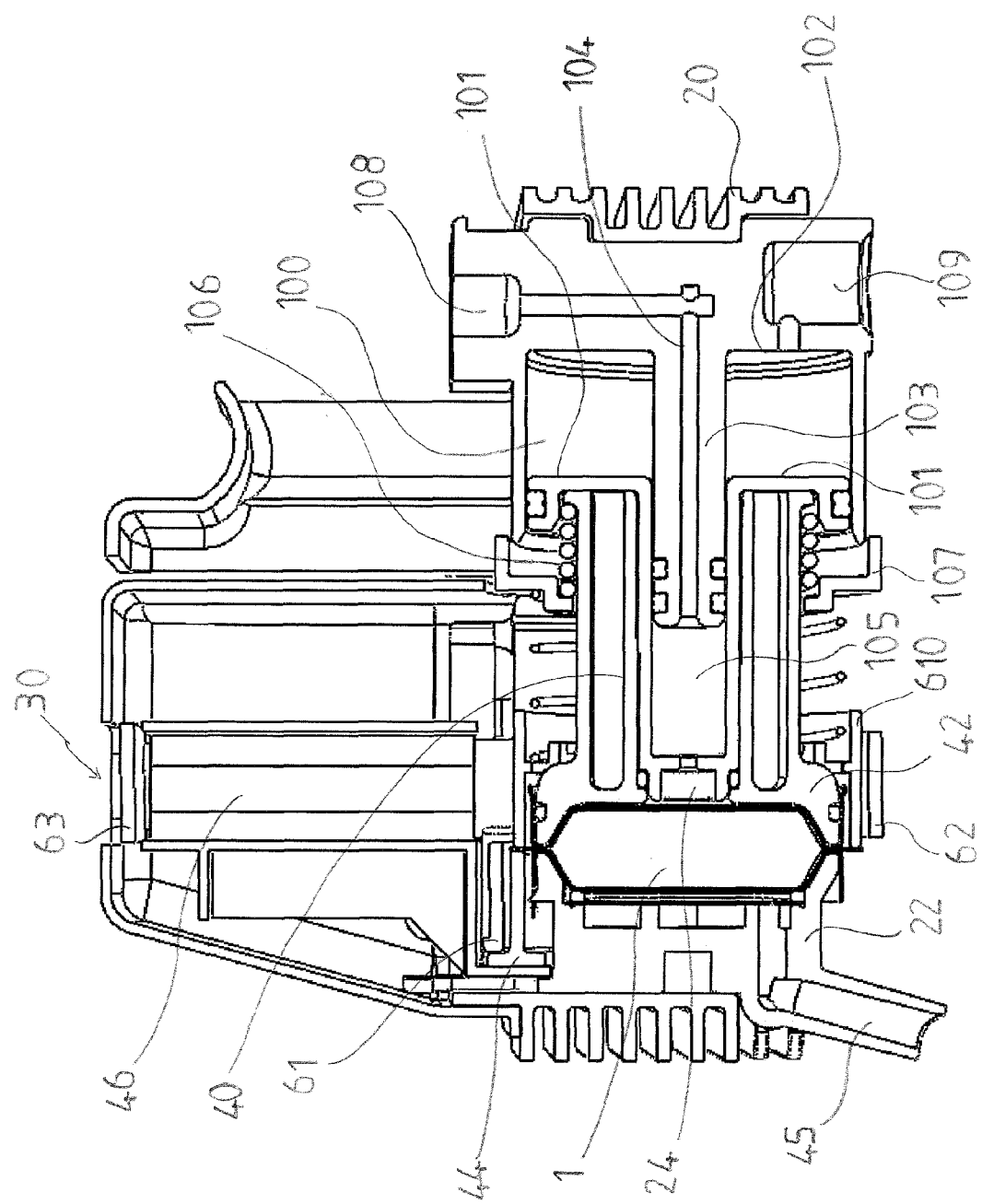

The pump supplies fluid to the thrust chamber 100 through the inlet 109. A thrust force is applied to the thrust surface 101 of the hydraulic cylinder 40, which retracts the return spring 106 and drives the head of the hydraulic cylinder 40 to move forwards, as illustrated in FIG. 6. This movement continues until the two chamber portions 24, 42 form a sealed volume chambers enclosing the dose 1 as illustrated in FIG. 7. The water heated by the boiler and flowed from the tank penetrates into the infusion chamber 7. The infusion chamber 7 is therefore closed successively by the infusion fluid inlet 108 and the supply channel 104 and the passages 105 and 24 allowing to infuse the dose 1. The discharge pipe 45 carried by the second chamber portion 22 allows to extract the beverage and deliver it to the container.

Once the infusion is complete, the drive device (not shown) acting on the ends of travel moving stop 66, 66 allows to withdraw it towards the rear of the closure device 60. During this backward translation, the second stripping means 44 ensure the separation between the dose 1 and the second chamber portion 22. The closure means return to the first position which allows thus to remove the dose 1 from the chamber 7. This step is illustrated in FIG. 8.

The head of the hydraulic cylinder 40, under the effect of the return spring 106 acting in compression, begins to be withdrawn backwards, as shown in FIG. 9.

The first stripping means 610 come into contact with the circumference of the dose 1 separating it from the first chamber portion 42. The dose 1 is then positioned between the two chamber portions without being interconnected to either of them.

Figure 10:
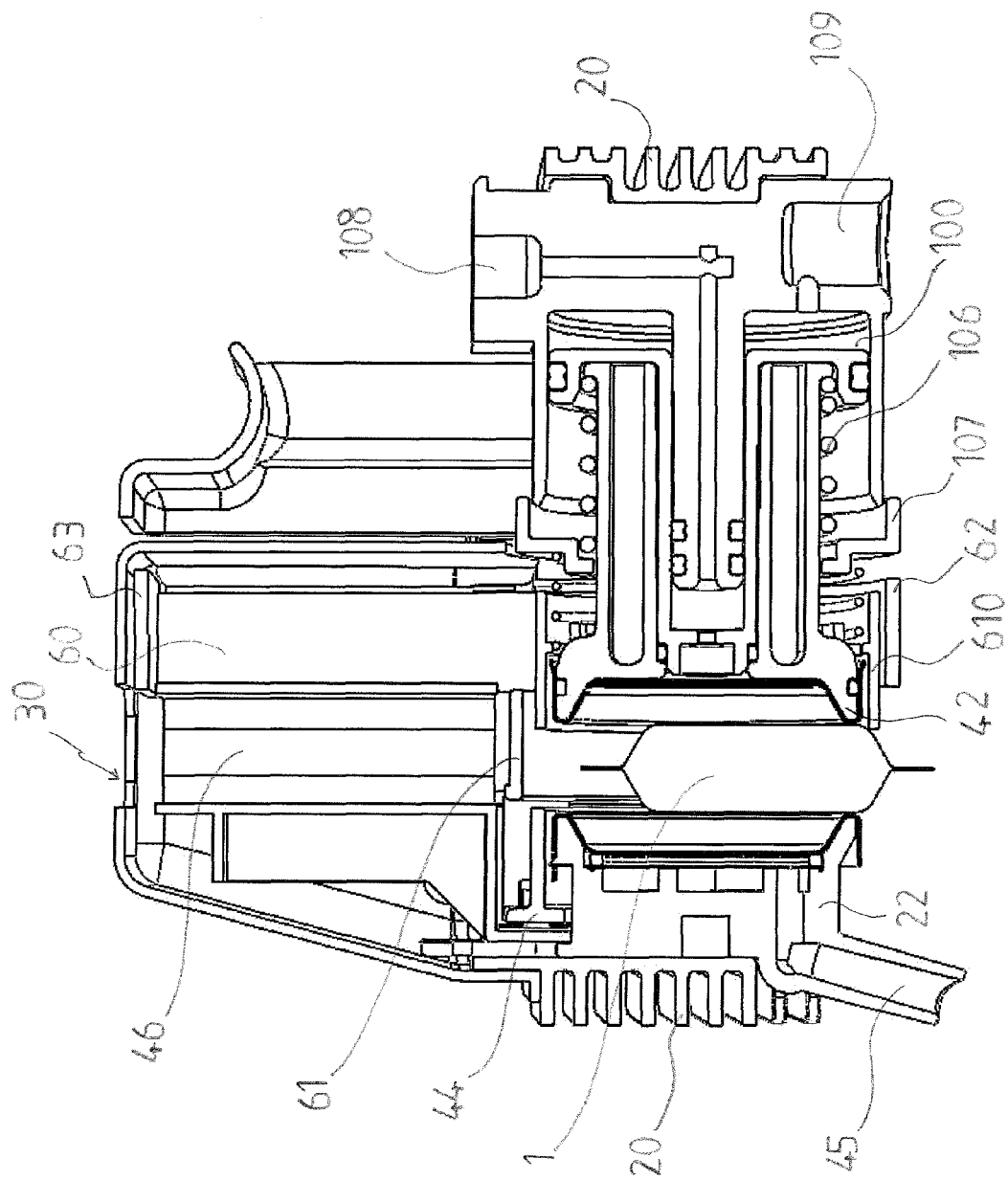

The two chamber portions 22, 42 are cup-shaped and appreciably guiding the dose 1 towards the opening of the infusion chamber 7 when they move apart. The closure device 60 is brought back to the first position: the downstream closure means 62 no longer prevent the ejection of the dose 1 and the latter can then fall by gravity towards the collecting tray of the infusion chamber 7. This step is illustrated in FIG. 10. Moreover, the obstructing means 63 leave the opening of the trap door 30 unobstructed and a new dose 1 can be inserted into the system 10.

Advantageously, the present invention operates sequentially and this improves significantly the beverage quality, the reliability of the existing systems, reduces the risks of the mechanism jamming and protects package integrity.

It also offers simple kinematics and structure. It has fewer parts, lower production cost, less defects and is less difficult to maintain.

It also offers conditional operation, that is to say, when operating the pump is slaved to the position of the closure device. The reliability of the system as well as the safety of users is enhanced and the package's integrity preserved.

It also offers improved sturdiness and is of a smaller size.

Many variants can be made to the previously described device without escaping the scope of the invention.

In particular, the closure device 60 can be arranged to translate along a main direction different from that of the longitudinal axis 11, such as for example a vertical axis or a horizontal axis perpendicular to the longitudinal axis 11. For such the closure device 60, that upstream closure means 61 and the downstream closure means 62 of such a device are shifted along this main direction.

In the example described above, the actuation of the first chamber portion 42 is fully ensured by a hydraulic cylinder 40. In other embodiments, the first chamber portion 42 can be ensured to be actuated at least partially manually, by means such as a lever, a cam, an eccentric for example, or by means such as an endless screw motor, or by means such as a pneumatic hydraulic cylinder. In particular, in order to close the infusion chamber, a part of the travel of the movable chamber portion is ensured to be manually performed by a lever, a cam or eccentric; another part of the travel of the movable chamber is ensured by a hydraulic cylinder or a motor.

The closure device 60 can be actuated by an electric motor or manually.

The system 10 described above is adapted to packagings which are different from the packaging shown in the figures, and such adaptation can be easily performed by changing the sizes and the configuration of the upstream downstream closure means 61 and the downstream closure means 62, the guiding means 46, the opening of the trap door 30 and the two chamber portions 22, 42.

The present invention is not limited to the embodiments described above, and can be applied to all embodiments within the spirit and scope of the present invention.

The invention is particularly applied to the systems in which the closure device includes only downstream closure means, without the existence of the upstream closure means. It is also applied to systems in which the closure device includes only upstream closure means, without the existence of the downstream closure means. It is also applied to the systems in which the position of the downstream closure means does not condition the position of the upstream closure means and vice versa.

REFERENCES

1. Dose
10. System
11. Longitudinal axis
12. Forward direction
13. Backward direction
20. Frame
22. Second chamber portion
24. Incoming fluid pipe
25. Shaft
30. Trap door
40. Hydraulic cylinder
42. First chamber portion
44. Second stripping means
441. Stripping finger
442. Stripping spring
443. Bearing surface
45. Discharge pipe
46. Guiding means
47. Housing for the spring
60. Closure device
61. Upstream closure means
62. Downstream closure means
63. Obstructing means
65. Arm
66. End of travel moving stop
69. Slide
610. First stripping means
641. Stripping finger
642. Stripping spring
7. Infusion chamber
100. Thrust chamber
101. Thrust surface
102. Hydraulic cylinder bottom
103. Fitting means
104. Supply channel
105. Passage
106. Return spring
107. Stop for the hydraulic cylinder spring
108. Inlet of the liquid to be infused
109. Thrust fluid inlet
110. Seal
111. Seal

What is claimed:

1. A system for making beverages, the system comprising:
an infusion chamber for receiving a dose of a product to be infused, wherein the infusion chamber is defined by a first chamber portion and a second chamber portion arranged to move apart from one another or come together in order to respectively open or close the infusion chamber;
an actuator arranged to control closure of the infusion chamber, the first chamber portion connected to the actuator; and
a closure device comprising:
an upstream closure arranged to selectively prevent or allow the dose to enter the infusion chamber when the infusion chamber is open,
a downstream closure arranged to selectively prevent or allow the dose to exit the infusion chamber when the infusion chamber is open,
wherein the closure device is arranged so as to pass alternatively:
from a first position in which:
the upstream closure prevents the dose from entering the infusion chamber,
the downstream closure allows the dose to exit the infusion chamber,
to a second position in which:
the upstream closure allows the dose to enter the infusion chamber,
the downstream closure allows receipt of the dose into the infusion chamber and prevents the dose from exiting the infusion chamber,
wherein an incoming fluid pipe supplies the infusion chamber,
wherein the upstream closure and the downstream closure are interconnected,
wherein the closure device is separate from the first and second chamber portions,
wherein the closure device comprising the upstream closure and the downstream closure is separate from the dose,
wherein the closure device is configured to translate along a main direction to pass alternatively from the first position to the second position, and
wherein the upstream closure and the downstream closure are arranged to have a mutual offset in the main direction.

2. The system of claim 1, wherein the incoming fluid pipe is connected to a supply device located upstream of the infusion chamber.

3. The system of claim 2, wherein the closure device guides reciprocating movement of the closure device when the closure device translates between the first and the second positions.

4. The system of claim 1, wherein the closure device is configured to translate along an axis of displacement and comprises a pair of ends of a travel moving stop distributed on each side of said axis of displacement.

5. The system of claim 1, wherein the actuator is a hydraulic cylinder.

6. The system of claim 5, wherein the hydraulic cylinder comprises a piston, a cylinder defining a thrust chamber and a return, wherein the hydraulic cylinder is arranged to introduce a pressurized fluid into the thrust chamber for deployment of the hydraulic cylinder for the return to retract the piston.

7. The system of claim 6, wherein the piston comprises a passage communicating on one hand with the incoming fluid pipe of the first chamber portion, and on an other hand with a supply channel of a supply means connected to a boiler.

8. The system of claim 7, wherein the cylinder comprises a fitting interconnected to the cylinder, extending in the thrust chamber, configured to slide within the piston and house the supply channel.

9. The system of claim 8, wherein the fitting and the passage have complementary shapes so that the fitting slides within the passage for guiding at least partially the piston.

10. The system of claim 6, wherein the cylinder comprises a bottom facing the piston and longitudinal walls extending from the bottom to define with the piston the thrust chamber, wherein transverse walls guide the piston.

11. The system of claim 1, wherein the second chamber portion comprises a discharge pipe arranged so as to conduct the infused beverage outside the system towards a space for collecting the infused beverage.

12. The system of claim 1, further comprising a receiving surface configured to accommodate a container for collecting the infused beverage, the second chamber portion being placed between the infusion chamber and the receiving surface.

13. The system of claim 1, further comprising a guiding means arranged to guide the dose to be introduced into the infusion chamber and to maintain the dose at a location facing the infusion chamber when the upstream closure is removed, wherein the guide means is connected to a frame of the system.

14. The system of claim 1, further comprising a trap door forming an opening upstream of the upstream closure, wherein the closure device includes an obstructing means arranged to:
   leave an opening formed by the trap door unobstructed when the closure device is in the first position, and to obstruct the opening of the trap door when the closure device is in the second position.

15. The system of claim 1, wherein the main direction is a horizontal direction.

* * * * *